June 24, 1941.  A. KOST  2,246,689
MECHANICAL MOVEMENT
Filed May 9, 1938  7 Sheets-Sheet 1
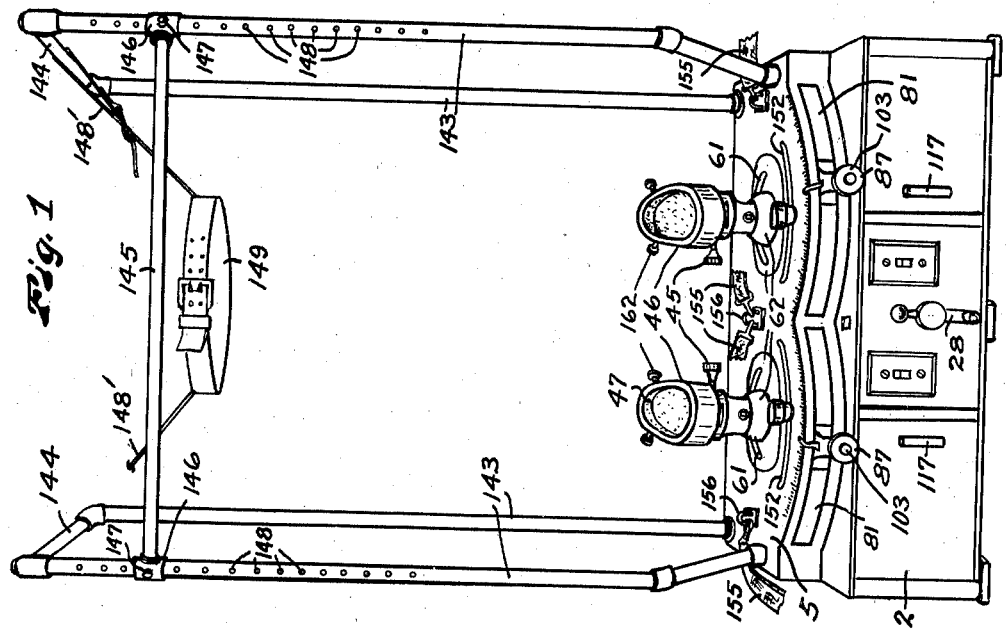
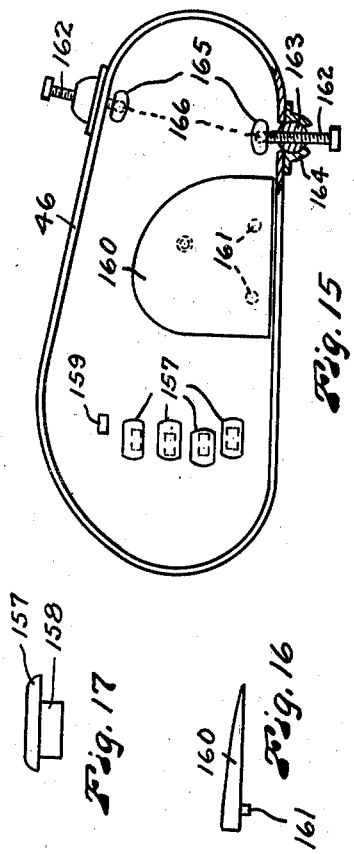
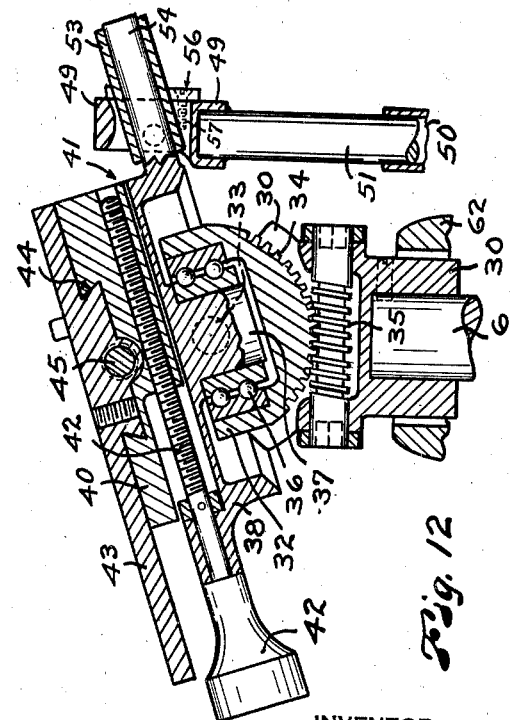
INVENTOR
Alwin Kost
BY
Fred C. Matheny
ATTORNEY June 24, 1941.  A. KOST  2,246,689
MECHANICAL MOVEMENT
Filed May 9, 1938   7 Sheets-Sheet 3
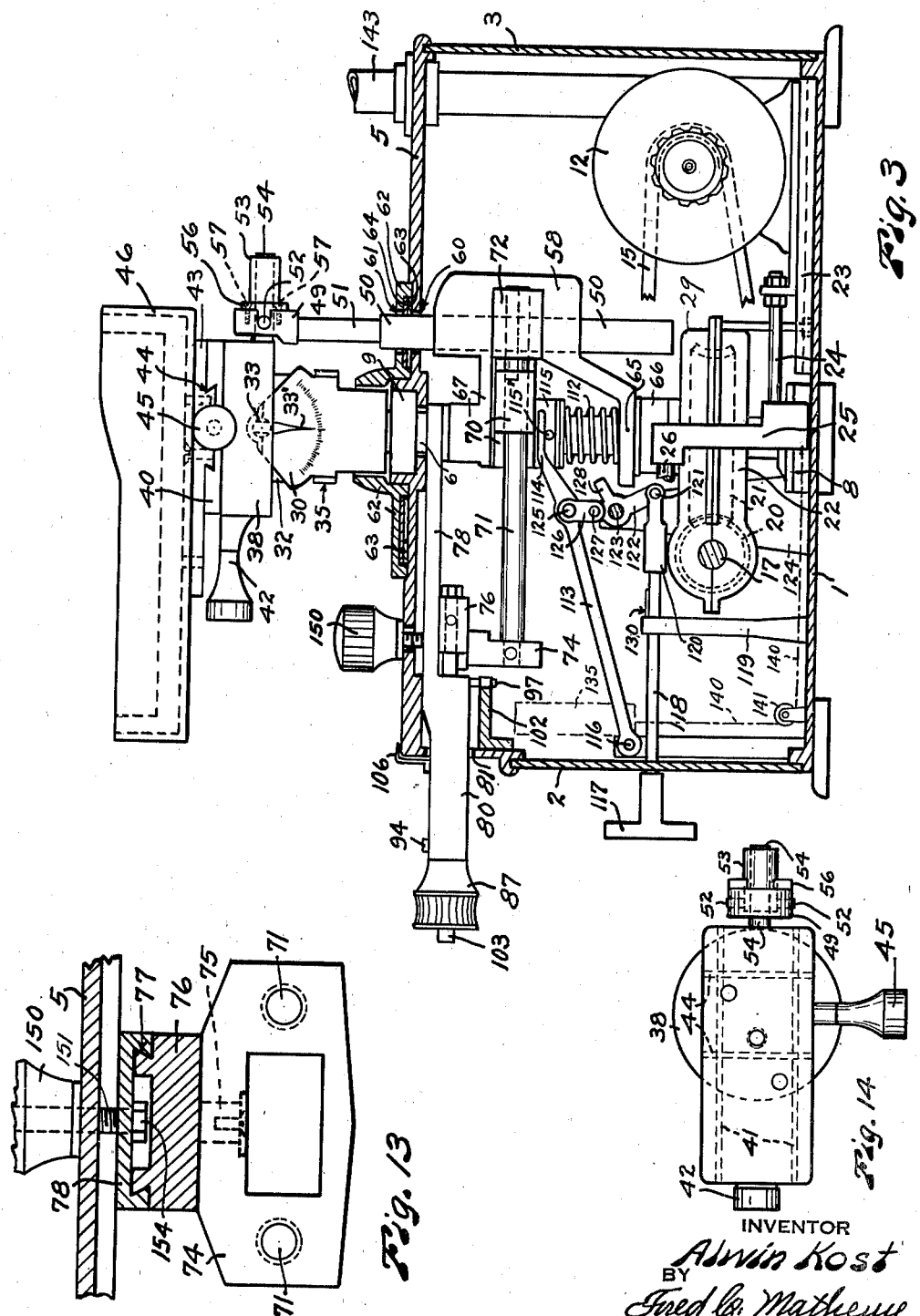
INVENTOR
Alvin Kost
BY
Fred C. Matheny
ATTORNEY

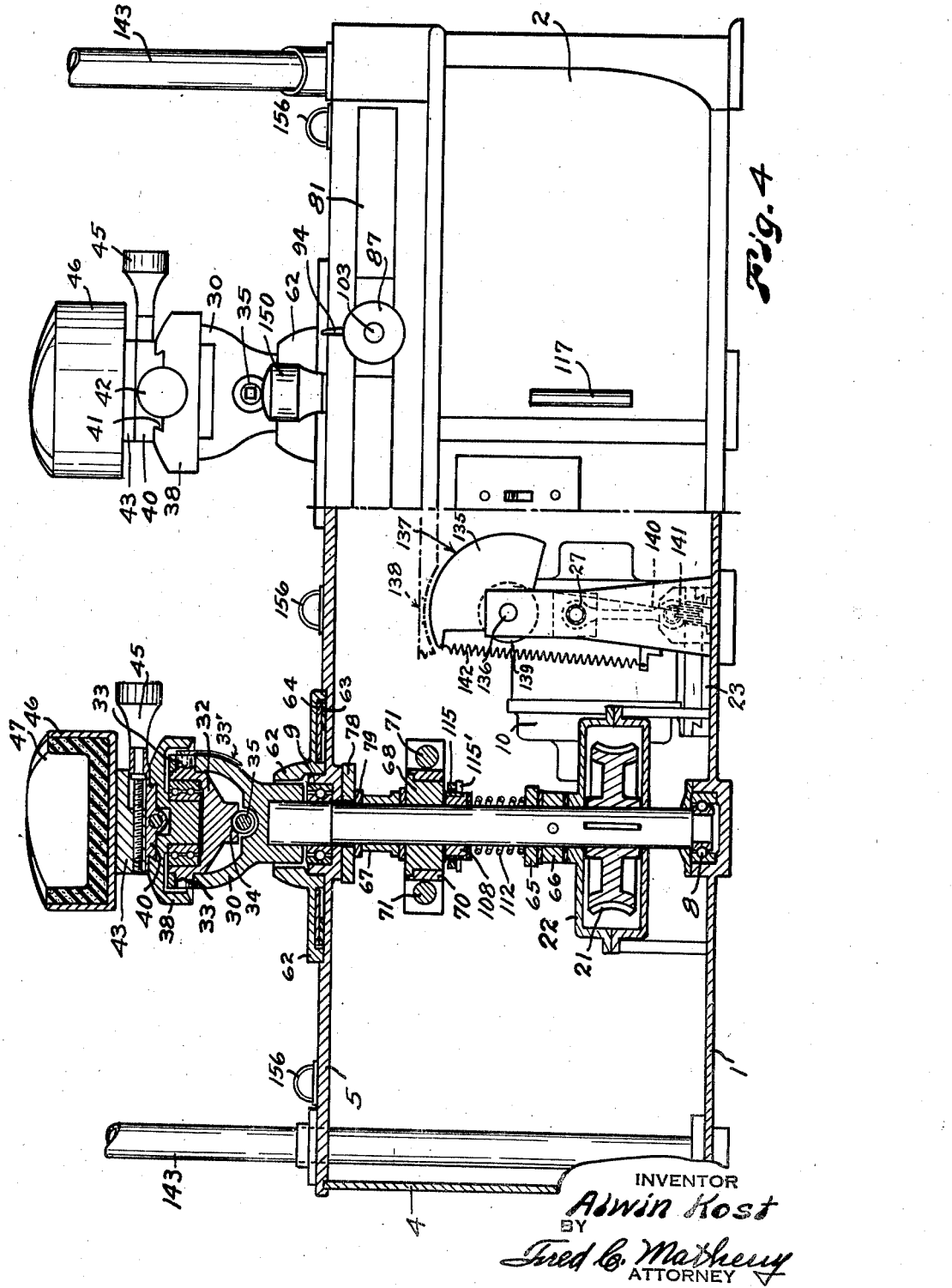

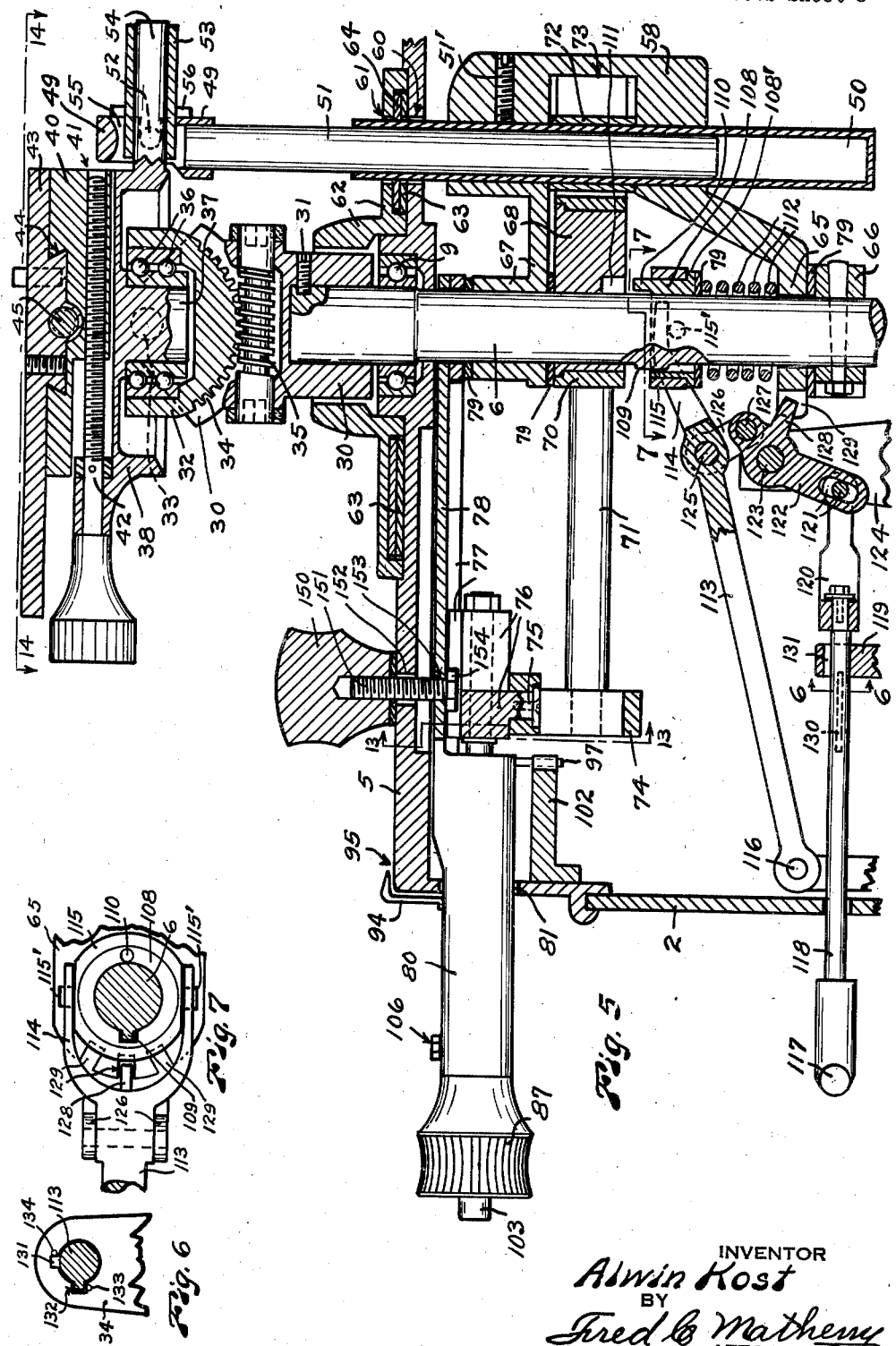

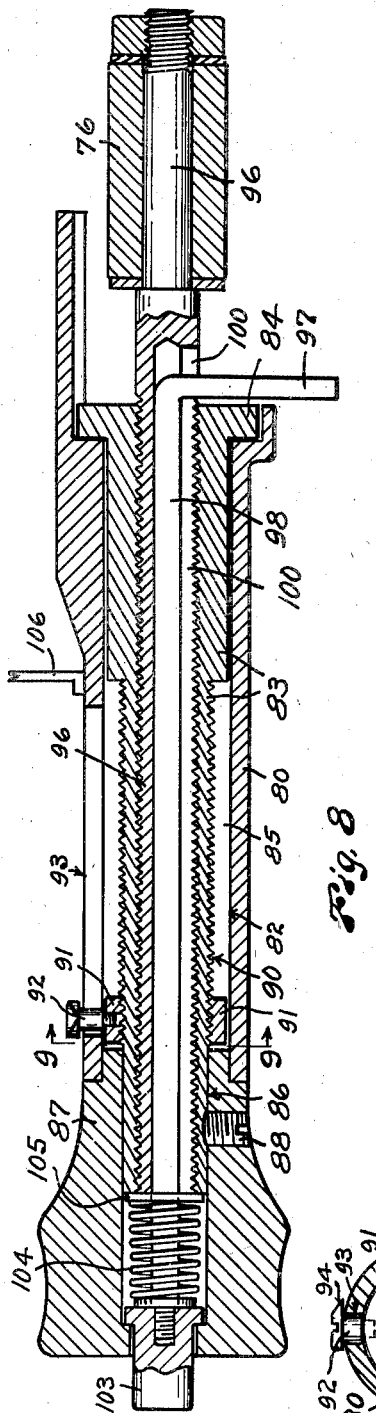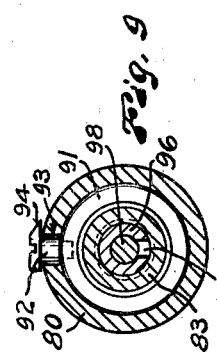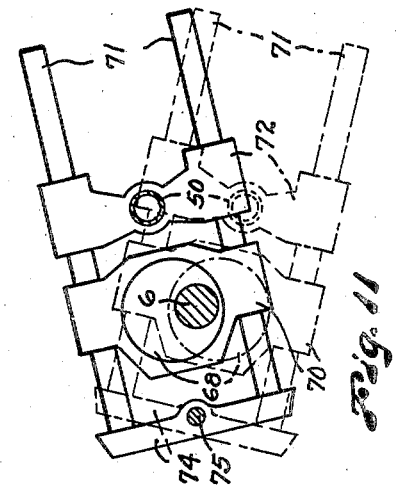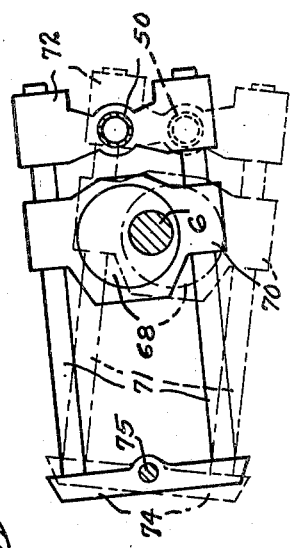

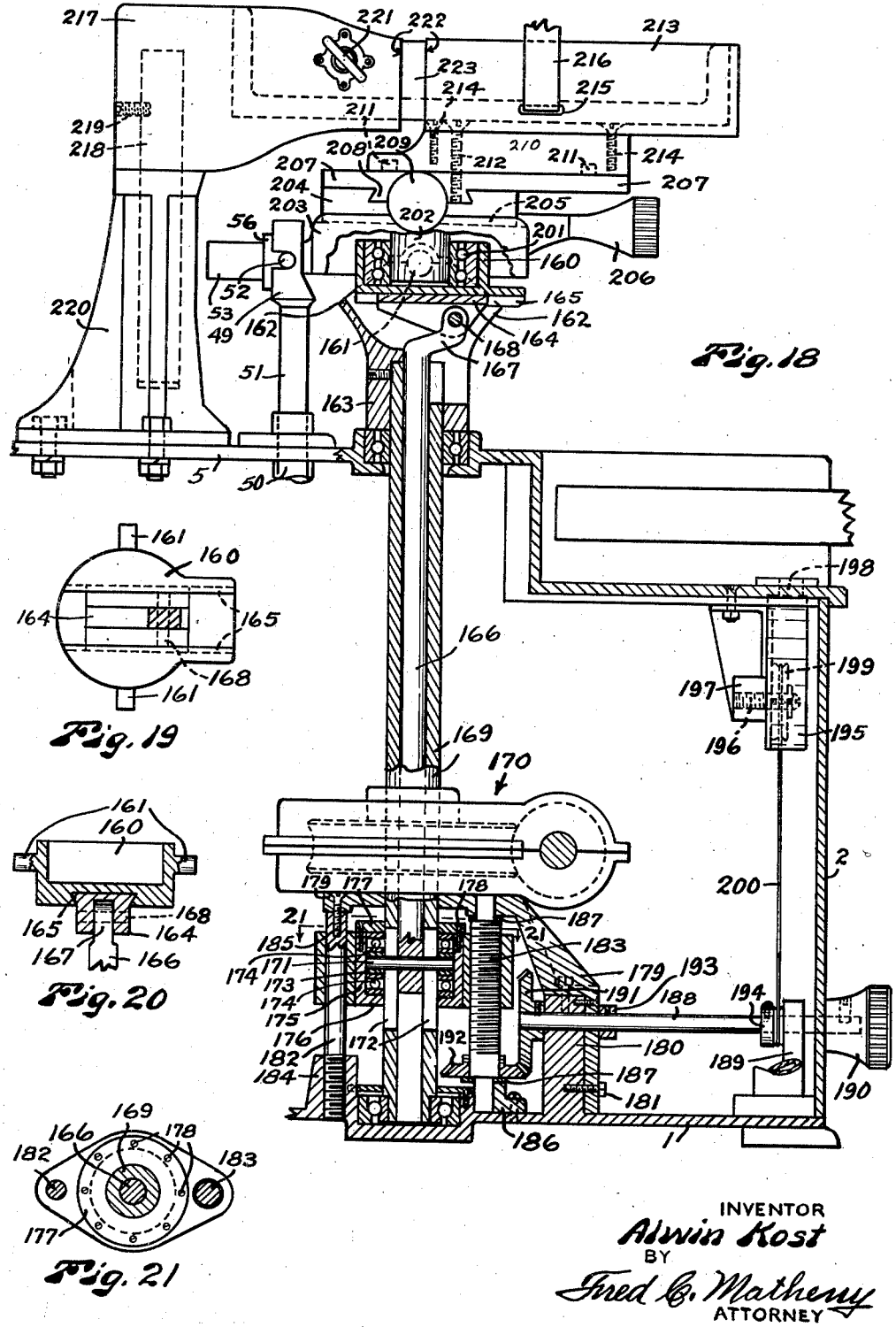

Patented June 24, 1941

2,246,689

UNITED STATES PATENT OFFICE 2,246,689

MECHANICAL MOVEMENT

Alwin Kost, Portland, Oreg.

Application May 9, 1938, Serial No. 206,852

19 Claims. (Cl. 128—25)

This invention relates to a mechanical movement applicable to many different uses.

I have herein disclosed one preferred form of this mechanical movement as embodied in a corrective device adapted to be used in administering corrective treatments to the muscles, bones and tissues of the feet, ankles, legs, hips and lower abdominal portions of the body.

A primary object of this invention is to provide a mechanical movement which, when embodied in a foot corrective device, will manipulate and move the feet and ankles in such a manner as to correct the position of the bones in the feet, relieve pressure on the nerves and blood vessels, overcome unnatural shapes which have been produced by the wearing of tight and improperly constructed shoes and generally restore the feet and ankles and legs to a stronger and more healthy and more normal condition.

Another object is to provide a foot corrective device which will improve the physical condition and posture of the entire body by strengthening and normalizing the feet and ankles and legs.

The feet are the foundation on which the human body is carried and the physical condition of the feet has an effect on the condition of other parts of the body. Under modern living conditions, people are liable to wear incorrectly shaped, high heeled, tight, ill fitting, shoes. Many people walk very little and only on smooth surfaces, as floors and level sidewalks. Walking on these smooth surfaces does not subject all of the muscles and bones of the feet and ankles to the use and movement required to keep them in a strong and healthy condition. The result is that the foot muscles deteriorate and allow the arches of the feet to flatten, displacing the tarsal and metatarsal bones and subjecting the blood vessels and nerves in the foot to unnatural pressures. This tends to obstruct the circulation in the feet, ankles and legs and restricts and irritates the nerves which lead to the feet and ankles. As the nerves which lead to the feet and those which lead to the lower abdominal organs all emanate from the spine at the location of the small of the back, an irritation of the nerves of the feet is very liable to cause trouble with the organs of the abdomen.

This mechanical movement when embodied in a foot corrective device provides an easy and efficient means for obviating, overcoming and correcting the troubles above pointed out by making it relatively easy for a user of the device to subject the feet, ankles and legs at frequent intervals, to corrective movements which will strengthen the muscles, stimulate the circulation, restore the bones to normal position and relieve abnormal pressures on the nerves and blood vessels. These movements are, to a certain extent, communicated to the legs and lower portions of the body and are particularly beneficial in reducing swollen ankles and varicose veins in the legs and in bringing about a more healthy condition of the lower abdominal organs.

A further object of this invention is to provide a mechanical movement of this nature which is well adapted to be employed in the construction of a foot corrective device having two footplates, said mechanical movement making it possible to simultaneously impart a wabbling movement and an oscillating movement to the two footplates and providing for reversal of the direction of wabbling movement of the footplates and for adjustment of the amplitude of said wabbling movement, and providing for independent adjustment of the amplitude of the oscillating movement of the two foot plates and for angular adjustment of the position of the arc of said oscillating movement and for total suppression of said oscillating movement of said footplates and said mechanical movement further providing for independent adjustment of the two footplates both sidewise and forwardly and rearwardly as respects the upright supports of the footplates.

Further objects of the invention are to provide a mechanical movement of this nature which is adjustable as to speed and amplitude of movement while the machine is in operation and which is further adjustable as to position so that it may be readily made to conform to the requirements of different individuals when said mechanical movement is embodied in a foot corrective device.

Further objects of the invention are to provide a mechanical movement in which the parts thereof are of simple strong and durable construction and in which the movement is well adapted for the purpose described.

Other and more specific objects of the invention will be apparent from the following description taken in connection with the accompanying drawings.

In the accompanying drawings, Fig. 1 is a perspective view of a foot corrective machine embodying a mechanical movement constructed in accordance with my invention.

Fig. 3 is a view in vertical section substantially on broken line 3—3 of Fig. 2, parts being shown in elevation.

Fig. 4 is a view partly in front elevation and partly in section substantially on broken line 4—4 of Fig. 2.

Fig. 5 is a fragmentary sectional view, on a larger scale than Fig. 2, taken substantially on broken line 5—5 of Fig. 2.

Figure 2:
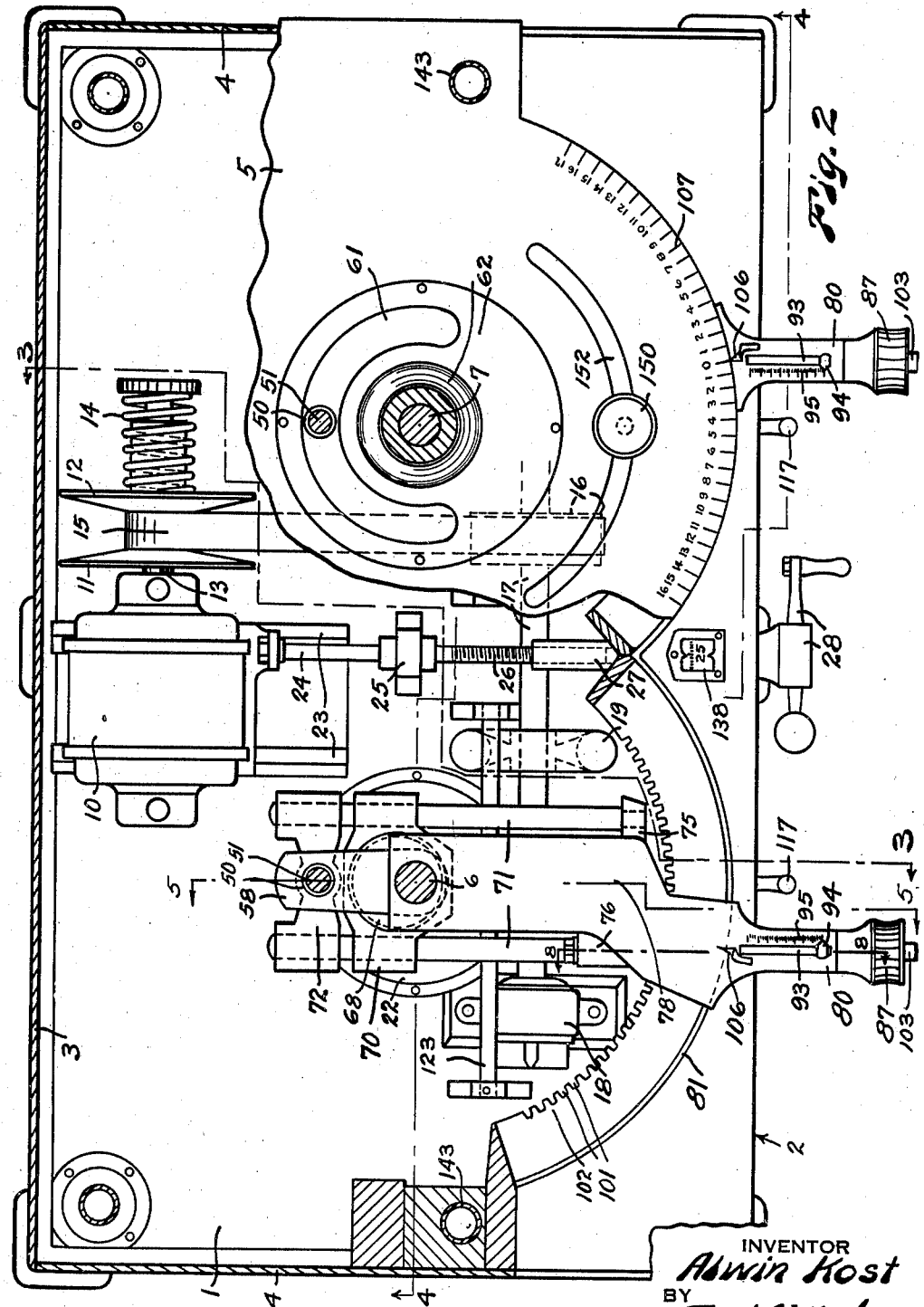
Fig. 2 is a plan view of the same with parts of the cover plate removed and parts of the mechanism shown in section.

Figs. 6 and 7 are fragmentary views substantially on broken lines 6—6 and 7—7 respectively, of Fig. 5, showing parts of a clutch operating mechanism.

Fig. 8 is a sectional view on a larger scale than Fig. 2, taken substantially on broken line 8—8 of Fig. 2, and showing a handle means by which the angular position of a footplate is adjusted and by which the amplitude of oscillation of said footplate is adjusted.

Fig. 9 is a sectional view substantially on broken line 9—9 of Fig. 8.

Figs. 10 and 11 are somewhat diagrammatic detached plan views of parts of the footplate oscillating mechanism illustrating the means for adjusting the amplitude of oscillation.

Fig. 12 is a fragmentary section showing an adjustable inclined crank means positioned differently than in Fig. 5.

Fig. 13 is a fragmentary sectional view substantially on broken line 13—13 of Fig. 5.

Fig. 14 is a plan view on a smaller scale than Fig. 5, substantially on broken line 14—14 of Fig. 5.

Fig. 15 is a detached plan view of a footplate with parts in section and the lining thereof removed.

Figs. 16 and 17 are detached side views of an arch positioner and a metatarsal positioner respectively.

Fig. 18 is a fragmentary vertical section, with parts in elevation, of an alternative form of the invention.

Figs. 19 and 20 are detached views in plan and section respectively of a cup bearing and adjustment block.

Fig. 21 is a sectional view on broken line 21—21 of Fig. 18.

Like reference numerals designate like parts throughout the several views.

The drawings show my mechanical movement as embodied in a foot corrective device, comprising a rectangular housing having a bottom 1, front wall 2, rear wall 3, two end walls 4 and a top portion or cover 5. The operating mechanism is mounted within this rectangular housing. This mechanism comprises two upright posts or shafts 6 and 7 positioned in spaced apart relation within the housing and adapted to support foot plate means as hereinafter described.

The shaft mounting and driving means and the footplate supporting, moving and adjusting means is in duplicate for each of shafts 6 and 7. This description refers to said means as applied to shaft 6 but will be understood to apply equally well to the means connected with shaft 7. The lower end portion of each upright post 6 and 7 is supported by a ball bearing 8 mounted in the bottom portion 1 of the housing, see Figs. 3 and 4. Each post 6 and 7 is further supported by a ball bearing 9 mounted in the top plate 5 of the housing.

The means for rotatably driving the two upright shafts 6 and 7 comprises a reversible electric motor 10, Fig. 2, having a variable speed pulley comprising two discs 11 and 12 with opposed conical faces positioned in opposed relation, with one disc 11 preferably secured to the shaft 13 of the motor and the other disc 12 movable toward and away from the disc 11 and urged toward the disc 11 by a compression spring 14. The variable speed pulley illustrated in the drawings is commonly known as a Reeves variable speed pulley and is readily obtainable on the market. An endless belt 15 connects the variable speed pulley 11—12 with a pulley 16 on a shaft 17. The shaft 17 is rotatably mounted preferably in ball bearing pillow blocks 18 which are secured to the bottom portion 1 of the housing. A flywheel 19 is preferably provided on the shaft 17 to insure a steady and even rotary movement of said shaft in operation. Two worms 20 on the shaft 17 operatively engage with two worm wheels 21 on the upright shafts 6 and 7 providing reduction speed gear means for transmitting rotation from the shaft 17 to the shafts 6 and 7. The worms 20 and worm wheels 21 are disposed in housings 22. To provide for varying the speed ratio between the variable speed pulley on the motor shaft 13 and the pulley 16 on the shaft 17, the motor 10 is movably mounted on two track members 23 which are secured to the bottom portion 1 of the housing and extend transversely thereof so that the motor can be moved on these track members toward and away from the shaft 17. The means for moving the motor 10 on the track members 23 comprises a push and pull rod 24 having one end portion fixedly secured to the motor and the other end portion fixedly secured to the lower end portion of an upright yoke 25. Another push and pull rod 26 is fixedly secured to the upper end portion of the upright yoke 25. The forward end portion of the push and pull rod 26 is threaded into a sleeve 27 which extends outwardly through the front wall 2 of the housing and has crank means 28 secured thereto by which the said sleeve may be rotated. The front wall 2 of the housing forms a bearing for the sleeve 27 and said sleeve and the crank member 28 are provided with suitable thrust means to engage the housing and prevent longitudinal movement of the sleeve. Rotation of the sleeve will move the push and pull rods 24 and 26 longitudinally and will move the motor 10 toward and away from the shaft 17. The upright yoke 25 serves as a means for rigidly connecting together the two push and pull rods 24 and 26 and as a means for elevating the push and pull rod 26 high enough so that the crank means 28 may be conveniently operated. When the motor 10 is moved on the track members 23 the variable speed pulley will be moved simultaneously therewith and the effective diameter of the variable speed pulley as respects the endless belt 15 will be varied. This varies the driving ratio between the variable speed pulley 11—12 and the pulley 16 on the shaft 17. For instance, if the variable speed pulley 11—12 is moved toward the pulley 16 it will tend to slacken the belt 15. As the belt 15 slackens the spring 14 will move the disc 12 toward the disc 11 thus crowding the belt 15 outwardly between the cone shaped discs 11 and 12 and simultaneously taking up the slack in the belt. This increases the effective working diameter of the cone shaped discs 11—12 as respects the belt 15 and steps up the gear ratio between the variable speed pulley 11—12 and the pulley 16. Conversely, movement of the variable speed pulley 11—12 in a direction away from the pulley 16 will draw the belt 15 between the cone shaped disc members 11 and 12 toward the axis of said members 11 and 12, and move the cone shaped disc member 12 away from the cone shaped disc member 11. This lowers the gear ratio of the pulley 11—12 relative to the pulley 16. The variable speed drive hereinbefore described is substantially noiseless in operation thus making it very desirable for use on a foot corrective device of this class.

The upper end portion of each shaft 6 and 7 is seated within a socket in a forked bracket member 30 and is fixedly secured to said bracket member 30 as by a set screw 31 so that the bracket member and shaft will rotate together. A cup shaped member 32 is pivotally mounted in the bracket member 30 by two relatively aligned pivot studs 33. The common axis of the pivot studs 33 is at right angles to the axis of rotation of the upright shaft on which the bracket member 30 is mounted. An arcuate worm segment 34 is rigidly connected with the lower portion of each cup shaped member 32. The worm segment 34 is arcuate and has a center which coincides with the axis which is common to the two pivot studs 33. An adjusting screw 35 is rotatably mounted in the bracket 30 and has threads which mesh with the threads of the worm segment 34. The angular position of the cup shaped member 32 relative to the bracket 30 may be varied by turning the adjusting screw 35. This provides for varying the angular position of the cup shaped member relative to the axis of rotation of the bracket 30 and the shaft on which it is mounted.

The cup shaped member 32 has a receptacle in the upper portion thereof for the reception of a ball bearing 36. The ball bearing 36 receives and rotatably supports a downwardly extending stub shaft 37 of a footplate supporting member 38. An adjustable block 40 has a dove tail connection 41 with the foot plate supporting member 38. A screw 42 is provided for adjusting the block 40 into any desired position relative to the member 38. Another block 43 has a dove tail connection 44 with the block 40 and is adjustable in directions at right angles to the direction of adjustment of the block 40. A screw 45 is provided for adjusting the block 43. A dish shaped foot plate 46 is secured to the block 43 and a lining 47 of padding material, as soft rubber, is preferably provided in the footplate 46.

The footplate mounting means just described provides upright rotatable means comprising the shaft 6 and bracket member 30, inclined crank means on the upper end portion of the rotatable means capable of having the angle thereof varied or adjusted by the screw 35 and worm segment 34, said inclined crank means comprising the pivotally mounted cup shaped member 32, ball bearing 36, stub shaft 37 and footplate supporting member 38; and a footplate mounted on the inclined crank means so that it can be adjusted in two directions at right angles to each other relative to the inclined crank means. The incline of the axis of the ball bearing 36 relative to the shaft will produce a wabbling motion to the footplate and the amount of this wabbling motion may be increased by increasing the angle of incline of the axis of said bearing relative to the shaft and may be decreased by decreasing the angle of incline of the axis of the bearing 36 relative to the shaft 6. When the axis of the stub shaft 37 coincides with and is aligned with the axis of the shaft 6 there will be no wabbling motion imparted to the footplate by rotation of shaft 6 but when the axis of the stub shaft 37 is inclined relative to the axis of the shaft 6, as shown in Fig. 12, then rotation of the shaft 6 will impart a wabbling or swash plate movement to the footplate.

The adjustments of the footplates provided by the screws 42 and 45 serve to move said footplates off center as respects the shaft 6. This provides for more bending of the ankle in one direction.

In addition to the wabbling motion to be imparted to each footplate it is desired to simultaneously impart an oscillating motion in generally horizontal directions to each footplate. This oscillating motion imparts a toe-in and toe-out motion to the foot and in so doing imparts a twisting motion to the leg. Also it is desirable to be able to vary the amplitude or extent of horizontal oscillation of each foot plate and to entirely suppress or eliminate this horizontal oscillation of either foot plate. It is further desirable to provide means for angularly adjusting the zone of oscillation of each foot plate independently, so that the machine may be adjusted to obtain the best results with persons who toe-in or with persons who toe-out or with persons whose feet are deformed so that the two feet do not point in the same direction. All of the above mentioned movements and adjustments are obtained by the mechanism hereinafter described and which is provided in duplicate in connection with each shaft 6 and 7 and the foot plate supporting member 38 connected therewith.

The means for oscillating each footplate 46 to impart thereto a toe-in and toe-out movement comprises an upright telescopic arm positioned rearwardly from each shaft 6 and 7 and extending from the interior of the housing upwardly to a point at the rear of the adjacent footplate supporting member 38. Each telescopic arm comprises a tube 50 and a piston member 51 telescopically disposed within the tube 50 and extending upwardly therefrom. The upper end portion of each piston member 51 has an enlarged head portion 49 which is connected by two pivot studs 52 with a tubular sleeve 53 which fits slidably and rotatably over a cylindrical shank 54 that is rigid with and extends rearwardly from the adjacent footplate supporting member 38. The common axis of the pivot studs 52 is at right angles to the axis of the shank 54 and intersects said axis of said shank 54. This provides freedom of movement between the shank 54 and piston member 51 as it allows relative oscillation on the pivot studs 52, oscillation of the tubular sleeve 53 on the shank 54 and longitudinal sliding movement of the shank 54 within the tubular sleeve 53. The head portion 49 of each piston 51 has an opening 55 therein of large enough size to provide operating clearance for the tubular sleeve 53 for all positions required in the operation of the device. The pivot studs 52 are rigid with the tubular sleeve 53. For convenience in assembly the head portion 49 may be slotted for the reception of the pivot studs 53 and removable retainer members 56 may be secured to the head portion 49 by screws 57 to complete the assembly.

The tube 50 is supported within a pivotally mounted bracket 58 and said tube 50 extends upwardly through an arcuate slot 60 in the housing cover 5 and a corresponding arcuate slot 61 in a cap member 62 which is secured to the housing cover 5. Preferably a bottom supporting ring 63 is disposed between the cap member 62 and the top 5 of the housing and a top slide ring 64 is positioned on top of the ring 63. The top slide ring 64 is preferably movable with the tube 50 and the bottom supporting ring is preferably stationary and has an arcuate slot registering with slots 60 and 61 in the housing top 5 and the cap member 62. The tube 50 is preferably secured by a screw 51' to the bracket 58 so that its weight is supported thereby, see Fig. 5.

The bracket 58 has a foot portion 65 which rests upon a collar 66 on the shaft 6 as shown in Fig. 5. The collar 66 is positioned just above the gear housing 29. The bracket 58 also has an upper portion 67 spaced a substantial distance above the foot portion 65. The shaft 6, Fig. 5, extends through both the upper portion 67 and foot portion 65 so that the bracket 58 is pivotally movable about the shaft 6 of an axis. Obviously, pivotally moving the bracket 58 will move the tube 50 and piston member 51 in an arc corresponding to the slot 61 shown in Fig. 2, and this will oscillate the footplate 46 back and forth about the axis of the stub shaft 37 thus imparting to said footplate a toe-in and toe-out movement simultaneously with the wabbling movement of said footplate. The wabbling movement of the footplate will necessarily result in imparting a vertical movement to the piston 51 and this vertical movement will be taken care of by sliding movement of the piston 51 within the tube 50. Also the footplate oscillating may be rendered inoperative by means which will presently be described.

The bracket 58 together with the sleeve 50 and piston 51 is oscillated by an eccentric disc 68 mounted on the upright shaft 6, Figs. 2, 4, 5, 10 and 11. The eccentric disc 68 is positioned within an eccentric yoke 70 that is slidable on two spaced apart parallel rods or bars 71. The rear ends of the bars 71 extend through a swivel block 72 which is positioned within a recess 73 in the bracket 58 and is pivoted on the tube 50, see Figs. 2, 5, 10 and 11. The forward ends of the bars 71 are secured to a cross bar 74. The cross bar 74 is pivotally mounted on a stud 75 which extends downwardly from a slide block 76. The slide block 76 is slidably adjustably connected by dove tail means 77 with a track member and lever arm 78 which is pivotally connected with the adjacent upright shaft 6 and is angularly movable. This permits the bars 71 to be angularly moved and the slide block 76 to be moved toward and away from the adjacent upright shaft 6. As the slide block 76 carries the pivot 75 about which the bars 71 swing it will be obvious that movement of this pivot 75 toward and away from the eccentric disc 68 will vary the distance of movement of the tube 50 and thus vary the amplitude of oscillation of the foot plate. Fig. 10 illustrates the two maximum angular positions of the bars 71 when the pivot member 75 is withdrawn to a maximum distance from the shaft 6 and Fig. 11 illustrates the greater angle which will be imparted to said bars when the pivot 75 is moved closer to the shaft 6. The track member and lever arm 78 has an integral handle portion 80 which extends outwardly from the front side of the housing through a transverse slot 81. The handle portion 80, see Fig. 8, has a longitudinal bore 82 within which is disposed a tubular sleeve 83. The inner end portion of the sleeve 83 has an enlarged portion 84 thereon which limits outward movement of the sleeve 83 within the handle portion 80. The portion of the sleeve 83 adjacent the enlarged portion 84 is of large enough diameter to fit snugly within the bore 82 of the handle portion 80 and the remainder of the length of said sleeve 83 is of smaller external diameter so as to leave an annular space 85 between it and the wall of the bore 82 of the handle 80. The outer end of the sleeve 83 extends beyond the outer end of the handle portion 80 and is seated within a receptacle 86 in a knob 87. A set screw 88 secures the knob 87 to the sleeve 83 so that when the knob 87 is rotatively moved the sleeve 83 will be rotated therewith. A thread 90 is provided on the exterior of that portion of the sleeve 83 between the inner end of the knob 87 and the larger inner end portion of the sleeve 83. An internally threaded ring member 91 is positioned on the sleeve 83 with the internal threads thereof engaging the threads 90 of the sleeve 83 and said ring member 91 is movable lengthwise of the space 85 in response to rotation of the sleeve 83. The pitch of the thread 90 is less and preferably about one half the pitch of the internal thread of the member 83 so that the ring member 91 will travel substantially one half as fast as a stem 96 when member 83 is rotated. A screw 92, rigid with the ring member 91, extends upwardly through a slot 93 in the handle member 80. A pointer 94, Fig. 9, is provided on the screw 92. Graduation marks 95 are provided on the handle 80 for cooperation with the pointer 94 to indicate the degree of lateral sweep or extent of oscillation which will be imparted to the footplate for all positions into which the pointer 94 may be moved.

The sleeve 83 also has an axial bore which is threaded for the reception of an externally threaded stem 96. The inner end of the stem 96 is rigidly connected with the slide block 76 so that longitudinal movement of said stem 96 will move the slide block 76 together with the pivot 75 and cross bar 74 toward or away from the upright shaft 6. Rotation of the knob 87 will rotate the sleeve 83 and thereby longitudinally move both the stem 96 and the ring member 91 which carries the pointer 94. The longitudinal movement of the stem 96 will adjust the amplitude of oscillation of the foot plate and the longitudinal movement of the ring member 91 will position the pointer 94 as respects the graduation marks 95 so as to correctly indicate the amplitude of these oscillations. The graduations 95 may represent degrees of oscillation or they may indicate any other desired unit. Adjustment of the amplitude of oscillation may be made while the machine is running.

The track member and lever arm 78, pivoted on shaft 6, and the handle 80, integral with said track member 78, serve as a means for angularly positioning the foot plate 46. To provide efficient means to releasably lock these parts in any desired angular position I provide a latch member 97 secured to a rod 98 which is slidably movable within the stem 96. The latch member 97 projects downwardly through a slot 100 in the rod 98 and is engageable within notches 101 in an arcuate segment 102, Figs. 2, 3 and 5, which is made rigid with the front portion of the housing. The outer end portion of the rod 98 is secured to a push button 103 which projects from the end of the knob 87. A compression spring 104 is interposed between the inner end of the push button 103 and a washer 105 which rests against the end of the tubular sleeve 83. This compression spring 104 thus exerts a yielding pressure against the push button 103 tending to hold the latch member 97 in engagement with the notched segment 102. By pressing the push button 103 inwardly the latch member 97 will be disengaged from the notches 101 in the arcuate segment 102 and the lever composed of track member 78 and handle 80 may be angularly moved relative to the post 6. The mechanism which carries the upright tube member 50 and piston 51 is connected with the track member 78 and will be angularly moved therewith with the result that the footplate will be similarly moved into any desired angular position. Preferably the handle 80 is provided with pointer means 106, Fig. 5, which indicates, by its relation to graduations 107, Fig. 2, on the frame plate 5, the angular position of the footplate. The feet of some persons normally tend to toe-in, the feet of some normally point straight ahead and the feet of others normally tend to toe-out. On persons who have abnormal feet the two feet may point in different directions. Also normal feet can be angularly moved outwardly farther than they can be moved inwardly from their normal position without placing them under undesirable strain. For these reasons it is desirable to be able to independently adjust the angular positions of the two footplates 46 to suit the feet of the individual patient. This adjustment can be made before starting the machine or while the machine is operating.

When the levers 78—80 in the machine shown in the drawings are set so as to position the pointers 106 at zero on the graduations 107 the foot plates 46 will point substantially straight ahead providing the eccentric discs 68 are in the position shown in Figs. 2, 3 and 5 or at one hundred eighty degrees to this position. Obviously the graduations 107 may be differently arranged or the relative angular positions of the footplates 46 and levers 78—80 may be varied.

For the purpose of securely holding the combined lever arm and track bar 78 in any position into which it is adjusted and to prevent vibration and relieve the latch member 97 of strain when oscillatory movement is being imparted to the bars 71 and parts connected therewith, I provide clamping means for this track bar. This clamping means comprises a thumb nut 150 threaded onto a stud bolt 151 which extends through an arcuate slot 152 in the top plate 5 and is threaded through the track bar 78 at location 153. Bolt 151 has a head portion 154 jammed tightly against the track bar 78. A recess in the slide block 76 provides clearance for head 154. When the lever 78—80 is to be angularly moved the nut 150 is loosened. After this lever has been properly positioned the nut 150 is tightened so as to securely hold the track member 78 in fixed position, prevent vibration of the support for the pivot 75 and relieve the latch member 97 of strain.

The eccentric disc footplate oscillating means will oscillate the footplates substantially equal distances in opposite directions from the position occupied by said footplates when said eccentric discs 68 are in the mid position shown in Fig. 2. The maximum angular positions of the footplate oscillating means are shown in Figs. 10 and 11. The fact that the human foot will toe-in further than it will toe-out without undue strain may be taken into account in initially setting the levers 78—80 and these levers may be set so that the oscillating means will angularly move the foot outwardly further than it will move said foot inwardly from the normal position of the foot.

Brass washers 79 are preferably provided on the shaft 6 at locations where relatively rotatable and nonrotatable parts come together, to minimize wear and reduce friction at these locations.

In some instances it may be desirable to disconnect the footplate oscillating means and impart only a wabbling or swash plate motion to the footplates. To accomplish this the eccentric disc 68 is preferably rotatably mounted on the shaft 6 and suitable clutch means is provided for selectively connecting or disconnecting the eccentric disc from the shaft 6 as respects rotary movement of said eccentric disc on said shaft. Preferably this clutch means comprises a collar 108 having a flange 108' on its lower end portion. This collar 108 is splined to the shaft 6 by a key or spline 109 so that said collar is free to move longitudinally of the shaft 6 but must rotate with said shaft 6. The collar 108, see Figs. 5 and 7, has a clutch tooth 110 positioned to engage within a recess 111 in the eccentric disc 68 when the collar 108 is in an elevated position and to be withdrawn from said recess 111 when the collar 108 is in a lowered position. A compression spring 112 is provided on the shaft 6 between the collar 108 and the base portion 65 of the bracket 58. This spring 112 yieldingly urges the collar 108 into an elevated position in which the clutch tooth 110 is projected into the recess 111 and locks the collar 108 and eccentric disc 68 together for synchronous rotation with the shaft 6. A sleeve 115 is rotatably mounted on the collar 108 and rests on the flange 108'. A clutch control arm 113 has a forked end portion 114 which extends over the sleeve 115 and engages with pins 115' on said sleeve 115 in such a manner that it will move the collar 108 downwardly on the shaft 6 when the forked end portion 114 is moved downwardly. Rotation of the sleeve 115 is prevented by providing flat sides on said sleeve for engagement with the forked end portion 114 of the clutch control arm 113, as shown in Fig. 7. The outer end of the clutch control arm 113 is connected by a pivot 116 with a fixed part of the housing. The operating means for the clutch control arm 113 comprises a clutch handle 117 positioned at the front of the housing and connected with a pull rod 118 which is longitudinally movable in the front wall 2 of the housing. A bracket 119 serves as a further means of support for the pull rod 118. The inner end portion of the pull rod 118 is rotatively connected with a forked member 120. The forked member 120 is connected by slot and bolt means 121 with a lever arm 122 which is fulcrumed on a shaft 123. The shaft 123 is supported in upright brackets 124. The clutch control arm 113 is connected by a pivot 125 and link means 126 and a pivot 127 with the lever arm 122. The lever arm 122 is also provided with a locking pawl 128 adapted to enter and lock within notches 129 in the foot portion 65 of the swinging bracket 58 to lock said swinging bracket against angular movement when said lever arm 122 is in the position shown in Fig. 5. The pull rod 118 is provided with a longitudinal spline 130, Figs. 5 and 6, which is longitudinally movable through a groove 131 in the bracket 119 when it is in alignment with said groove 131. The bracket 119 also has a shallow recess in its front side, preferably at an angle of about ninety degrees from the groove 131, in which the end portion of the spline 130 will rest when the several parts are in the position shown in Figs. 5 and 6. Preferably two stop lugs or pins 133 and 134 are provided adjacent the recess 132 and groove 131 respectively so that they will be engaged by the spline 130 and rotary movement of the pull rod 118 thereby limited. When the clutch handle 117 and pull rod 118 are in the position shown in Fig. 3 the clutch tooth 110 will be positioned in the recess 111 of the eccentric disc 68 and the locking pawl 128 will be clear of the notch 129 and the clutch will be in engaged position. To disengage the clutch and lock the bracket 58 against swinging movement the operator grasps the handle 117, longitudinally moves the pull rod 118 outwardly until the spline 130 is clear of the groove 131, then turns the handle 117 and rod 118 counterclockwise substantially ninety degrees until the spline 130 engages the stop pin 133, then releases the handle 117 and allows the end portion of the spline 130 to enter the recess 132, where said spline will remain, due to the action of the spring 112, until it is manually released. Outward movement of the pull rod 118 will angularly move the lever arm 122 from the position shown in Fig. 3 to the position shown in Fig. 5. This will move the locking pawl 128 into the notch 129 so as to lock the bracket 58 against angular movement and at the same time it will move the forked end 114 of the clutch control arm 113 downwardly thus moving the collar parts 108 and 108' and 115 downwardly. This withdraws the clutch tooth 110 from the recess 111 and disengages the clutch. To reengage the clutch the spline 130 is withdrawn from the recess 132 and the pull rod 118 is turned clockwise until the spline 130 encounters the stop pin 134 and then released. This allows the spring 112 to move the collar 108 upwardly and engage the clutch tooth 110 within the recess 111 of the eccentric disc. At the same time the pull rod 118 and handle 117 are moved inwardly into the position shown in Fig. 3.

To indicate the speed at which the shafts 6 and 7 are being driven I provide speed indicator means comprising a speed indicating member 135 rotatably mounted on a bearing 136 and having a graduated arcuate portion 137 which is visible through a sight opening 138 in the cover portion 5 of the housing. A sheave 139 is secured to the speed indicating member 135 in concentric relation as respects the bearing 136. A flexible connector 140 passes around the sheave 139 and is secured to said sheave. This flexible connector passes over suitable guide sheaves 141 and is secured to the yoke 25 by which the motor 10 is moved to vary the gear ratio of the variable speed pulley 11—12. A tension spring 142 is connected with the speed indicating member 135 yieldingly urging said speed indicating member in one direction and maintaining a tension on the flexible connector 140. When the yoke 25 is moved, so as to move the motor to change the gear ratio of the variable speed driving pulley 11—12 the flexible connector 140 will either be slackened so as to allow the spring 142 to angularly move the speed indicating member 135 in one direction or a pull will be exerted on said flexible connector 140 to angularly move the speed indicating member 135 in the other direction. As the motor 10 operates at a constant speed and the position of this motor determines the speed ratio of the variable speed pulley 11—12 it is possible to graduate the member 135 so that it will indicate substantially the speed of rotation of the shafts 6 and 7.

Preferably the machine has four supports 143, Fig. 1, which extend upwardly from locations adjacent the four corners of the machine. The upper ends of the two supports 143 at each side of the machine are preferably connected with each other by side bar means 144. A cross bar 145 extends crosswise between the two front upright supports 143 and is slidably and adjustably connected with said two front upright supports, preferably by T fittings 146 which fit slidably on said supports 143 and have pins 147 which extend through transverse holes 148 in the two front supports 143. The cross bar 145 forms a convenient, vertically adjustable, hand hold for a person who is standing on the footplates. The side bars 144 prevent a person from falling sidewise off of the machine and said side bars 144 may be used as supports for sling straps 148' which are connected with a belt 149 that is adapted to be placed around the waist of a person standing on the footplates. The belt 149 will only be used in instances where the person using the machine needs a support in addition to the cross bar 145.

In some cases it may be desirable for a person to use the machine while sitting down. In these cases a seat, as a stool or chair, not shown, is placed directly behind the machine at the correct elevation and the person using the machine sits on this seat and places the feet on the footplates. When the person thus uses the machine while seated it is preferable to extend an adjustable sling member 155 over each knee. These sling members 155 may be partially or entirely of elastic material to provide a resilient pressure and said sling members 155 are preferably secured to rings 156 on the top plate 5 of the housing. A fragment only of one of these slings is shown. By the use of these sling members any desired pressure may be exerted on the knees to hold the feet down on the footplates with as much force as desired.

The various adjustments provided in connection with the mechanical movement embodied in this device render said mechanical movement well adapted for use in connection with the foot corrective device herein described, or for numerous other uses not herein specifically set forth.

If the stub shaft 37 is adjusted into axial alignment with the shaft 6 and the clutch devices disengaged as respects the eccentric disc 68 then operation of the motor 10 in either direction will rotate the shaft 6 without imparting any movement to the footplate. If the clutch means 108—111 is engaged while the stub shaft 37 is in axial alignment with the shaft 6 and the machine is then operated the footplate will be oscillated in a horizontal plane. The amplitude of this oscillation may be varied by varying the distance of the pivot 75 from the shaft 6, as illustrated in Figs. 10 and 11. Also the angular position of the footplate may be varied by loosening the thumb nut 159, releasing the catch member 97 and angularly moving the lever 80—78. If the screw 35 is adjusted so as to position the axis of the stub shaft 37 at an angle to the axis of the shaft 6, then, when the shaft 6 is rotated, a wabbling or swash plate movement will be imparted to the footplate. The amplitude of this wabbling movement will vary in proportion to the angle of the axis of the stub shaft 37 relative to the shaft 6. This swash plate movement may be imparted to the footplate either with the clutch mechanism in engaged or disengaged position. When the swash plate movement is imparted to the footplate with the clutch mechanism in engaged position the resultant will be a combined wabbling and oscillatory movement of the footplate and the amplitude of the oscillatory movement may be adjusted while the machine is running. Also the angular position of the zone of oscillation may be adjusted about the axis of the shaft 6, either while the machine is operating or while it is inoperative. The speed of operation may be varied at will, and by reversing the motor, the direction of the swash plate movement may be reversed. Also the screws 42 and 45 may be moved to adjust the position of the footplate either transversely or longitudinally relative to the axis of the shaft 6.

Indicators are provided to accurately indicate all of the various adjustments and settings of the machine. This makes it possible to quickly and easily adjust the machine to obtain any predetermined setting of the same. This feature is of great advantage when this mechanical movement is embodied in a foot corrective device, as it makes possible quick and easy adjustment of the machine to suit the requirements of a plurality of patients who are successively using the machine.

The foot plate adjusting screw 35 may have square holes in the ends thereof to facilitate adjustment. The pitch of the threads of this screw 35 is such as to make it self locking. A pointer 33' secured to one of the pins 33, see Figs. 3 and 4, indicates the angular position of the footplate 46 by reference to graduations on the forked bracket member 30.

Preferably each footplate 46, Figs. 15 and 17 is provided near the toe portion with a plurality of metatarsal positioners 157 of various sizes and shapes and thicknesses. Each positioner 157 has a shank 158 adapted to fit within a suitable recess in the foot plate. The shanks 158 are differently positioned on the different members 157 and are preferably rectangular and fit into rectangular holes 159 in the footplate. By interchanging and reversing these positioners various adjustments are secured. One positioner 157 is omitted in Fig. 15 to show the hole 159. The scale in Fig. 17, is larger than in Fig. 15. These metatarsal positioners are located under the metatarsal portion of the foot so as to properly support feet of different shapes which are being treated. A substantially wedge shaped interchangeable arch support 160 Figs. 15 and 16 having dowel pins 161 which fit within suitable holes in the footplate 46 is also provided for use in the footplate 46 to support the arch of the foot when needed. Also two os calcis positioners comprising screws 162 threaded through balls 163 in sockets 164 in the heel portion of the footplate are provided. The screws 162 have flattened knob portions 165 secured to their inner ends by universal joints 166 for positioning and supporting the heel portion of the foot. All of the supporting devices just described are separated from direct contact with the feet by proper padding, when in use. For instance, the sponge rubber lining 47 may be interposed between the foot and the supporting members 157, 160 and 165.

Figs. 18 to 21 show a modified form of the invention. These figures disclose mechanism for adjusting the angle of a footplate while the machine is running. Also these figures disclose a dual or two part footplate especially designed to impart a corrective movement to the mediotarsal joints of the foot. Also these figures disclose modified indicator means for indicating the amplitude of the wabbling movement which is being imparted to the footplate. The means for adjusting the amplitude of wabbling movement while the machine is operating is useful when this mechanical movement is embodied in mechanisms other than foot corrective devices.

Referring to Figs. 18 to 21, fragments of the bottom 1, front wall 3 and top or cover 5 of the housing are designated by the same numerals as in the preceeding figures. The alternative mechanism comprises a bearing cup 160, pivoted by bearing studs 161 in the forked upper end portion 162 of a bracket member 163. This pivotal mounting provides for tilting movement of the bearing cup 160 by an off-center connection to said bearing cup, as hereinafter set forth. A sliding block 164 is connected with the bottom portion of the bearing cup 160 by dove tail means 165. An upright adjusting rod 166 has an inclined upper end portion 167 which is connected by a pivot 168 with the sliding block 164. The direction of movement of sliding block 164 in bearing cup 160 is substantially at right angles to the axis of bearing studs 161 and the pivot 168 is positioned to one side of the vertical axis of adjusting rod 166 so that longitudinal movement of adjusting rod 166 will tilt the bearing cup 160 and the sliding block 164 will provide an adjustable connection between the adjusting rod 166 and bearing cup 160.

The adjusting rod 166 is positioned within a tubular upright shaft 169 which corresponds to either of the shafts 6 or 7 of Figs. 1 to 17 and said shaft 169 is adapted to be driven in the same manner by similar worm drive means indicated generally by 170. The lower end portion of adjusting rod 166 has a transverse pin 171 tightly fitted therein and projecting outwardly through longitudinally extending slots 172 in tubular shaft 169. The outer ends of the pin 171 are seated in a pin collar 173 which extends around the tubular shaft 169. The pin collar 173 has two flat race thrust bearings 174 positioned above and below it respectively. A bearing housing 175 encloses the collar 173 and thrust bearings 174, said housing having an integral bottom portion 176 and having a top cover 177 secured thereto by screws 178 so that bearings 174 are properly housed and supported. The pin collar 173 and the bearing race members adjacent thereto rotate with the tubular shaft 169 while the bearing housing 175 and outer race members of the bearings are held against rotation. A frame bracket 179 secured to a fixed frame member 180 by screws 181 extends upwardly and over the top of the bearing housing 175. The bearing housing 175 is supported for vertical movement on an upright post 182 and an upright adjusting screw 183. The lower end portion of the post 182 is threaded into a boss 184 which is rigid with the bottom 1 of the housing and the upper end portion of said post is connected with the frame bracket 179 by a screw 185. The adjusting screw 183 is threaded into the bearing housing 175 and the upper end portion of said adjusting screw is journaled in the frame bracket 179.

The lower end portion of the adjusting screw 183 is journaled in a bearing 186 secured to the bottom 1 of the housing. Washers 187 are interposed between shoulders on the respective end portions of the adjusting screw 183 and the bearing 186 and frame bracket 179 to serve as thrust bearings.

A horizontal shaft 188 is journaled in frame parts 184 and 179 and in another frame part 189. A turn knob 190 is secured on the shaft 188 at the front side of the machine. A bevel gear 191 is secured to the inner end portion of the adjusting shaft 188 and meshes with another bevel gear 192 which is secured to the adjusting screw 183. A collar 193 on adjusting shaft 188 prevents endwise movement in one direction of said shaft. Endwise movement of said shaft in the other direction is prevented by the hub of bevel gear 191 and by a small sheave 194 which is secured to shaft 188 adjacent frame part 184. Obviously turning of shaft 188 will rotate adjusting screw 183 and vertically move bearing housing 175. This will vertically move adjusting rod 168 and vary the inclination of bearing cup 160 and parts connected therewith.

A tilt angle indicator dial 195, having a cylindrical peripheral portion provided with graduations, not shown, is mounted for oscillation on a bearing member 196 which is secured to a fixed bracket 197. An observation opening 198 shown by dotted lines in Fig. 18, is provided in the housing part 3. A sheave 199 is secured to the dial 195 and an endless flexible connector 200, preferably a wire, passes around this sheave 199 and the sheave 194. When adjusting shaft 188 is turned the sheave 194 will be turned therewith and the connector 200 will turn the dial 195 to properly register the inclination of the bearing cup 160 and parts connected therewith. Adjustment of the angle of the bearing cup 160 may be made while the machine is in operation as well as while the machine is at rest.

The bearing cup 160 carries a ball bearing 201 which receives a stub shaft 202 of an inverted cup member 203. Devices similar to those disclosed in Figs. 1 to 16 and correspondingly numbered are provided for imparting a toe-in and toe-out movement to the members 203. An adjustable plate 204, corresponding to plate 40 of Figs. 4, 5 and 12, is mounted in dove tail means 205 in inverted cup member 203 and is movable in a direction parallel with the footplate by adjusting screw 206. Another plate member 207 is mounted in dove tail means 208 on the plate member 204 and is movable by an adjusting screw 209 in a direction crosswise of the footplate. An offset block 210 is held in position on the plate member 207 by dowel pins 211 and is secured to said plate member 207 by a screw 212. A forward section 213 of a dual footplate is secured to the offset block 210 by screws 214. Slots 215, only one of which is shown, are provided in the sides of the foot plate section 213 for the reception of straps 216 which may be fastened across the top of the foot of the person using the machine. A rear section 217 of the dual footplate cooperates with the forward footplate section 213 to complete the footplate. The rear footplate section 217 has a shaft 218 rigidly fitted therein and secured thereto by a screw 219. This shaft 218 extends downwardly from the rear footplate section 217 and at right angles thereto and is pivotally seated in a suitable recess in a supporting column 220 which is secured to the top plate 5 of the housing. The shaft 218 may be quickly and easily lifted out of the recess in the column 220 when the dual footplate is to be removed and a one piece footplate, such as the footplate 46 shown in Figs. 1, 3 and 4 used. When the shaft 218 is removed from the column 220 a cap, not shown, will preferably be placed on the top of this column. Os calcis support means, of a form more fully shown in Fig. 15, is provided in the rear footplate section 217 and indicated generally by 221.

The adjacent ends of the forward and rear footplate sections 213 and 217 are spaced apart as indicated by 222 to allow for relative angular movement therebetween. It will be noted that this break 222 in the dual footplate is substantially in alignment with the axis of the tubular shaft 169. A lining 223 of relatively thick and elastic sponge rubber is provided within the footplate sections 213 and 217. The forward footplate section 213 has a universal tilting movement while the rear section thereof moves angularly from side to side. Thus a swash plate movement is imparted to the arch and toe portion of the foot while the heel portion is supported so that it will move from side to side. This imparts a very desirable corrective movement to the medio-tarsal joints of the foot. It has been found that many persons suffer from medio-tarsal joint trouble or trouble with the joints in the medial or arch portion of the foot just in front of the ankle. This may result from the wearing of shoes with high heels which have thrown the bones out of proper alignment at this location. It is desirable to correct this defect in order that full benefit may be derived from the use of the single footplates of the form shown in Figs. 1, 3 and 4. When treatments using the dual footplate shown in Fig. 18 are given the amplitude of the swash plate movement imparted to the footplate will be small, as the medio-tarsal portions of a normal foot admit of only a limited amount of movement.

It will be understood that the dual footplate shown in Fig. 18 may be applied to the machine shown in Figs. 1 to 17 and that the single footplate of Figs. 1, 3 and 4 may be applied to the machine shown in Fig. 18.

The provision for adjusting the inclination of the footplate while the machine is in operation is very desirable in a foot corrective machine because the correct amount of incline for some patients can best be determined by adjustment of the footplates while the corrective treatment is being given.

The foregoing description and accompanying drawings clearly disclose a preferred embodiment of my invention but it will be understood that this disclosure is merely illustrative and that such changes may be made as are fairly within the scope and spirit of the following claims.

I claim:

1. In a mechanical movement of the class described, a driven shaft; bearing means adjustably connected with an end portion of said driven shaft and having an axis normally inclined relative to the axis of said driven shaft and intersecting the axis of said driven shaft; a plate supported by said bearing means for universal tilting movement by rotation of said driven shaft; means for adjusting the inclination of the axis of said bearing means relative to the axis of said driven shaft to vary the amplitude of universal tilting movement of said plate; plate oscillating means adapted to oscillate said plate from side to side angularly about the axis of said plate simultaneously with the tilting movement thereof; and adjusting means connected with said plate oscillating means whereby the amplitude of oscillation of said plate may be varied.

2. In a mechanical movement of the class described, a driven shaft; bearing means adjustably connected with an end portion of said driven shaft and having an axis normally inclined relative to the axis of said driven shaft and intersecting the axis of said driven shaft; a plate supported by said bearing means for universal tilting movement by rotation of said driven shaft; means for adjusting the inclination of the axis of said bearing means relative to the axis of said driven shaft to vary the amplitude of universal tilting movement of said plate; plate oscillating means adapted to oscillate said plate from side to side angularly about the axis of said plate simultaneously with the tilting movement thereof, and control means connected with said plate oscillating means for rendering said plate oscillating means inoperative.

3. In a mechanical movement of the class described, a driven shaft; bearing means adjustably connected with an end portion of said driven shaft and having an axis normally inclined relative to the axis of said driven shaft and intersecting the axis of said driven shaft; a plate supported by said bearing means for universal tilting movement by rotation of said driven shaft; means for adjusting the inclination of the axis of said bearing means relative to the axis of said driven shaft to vary the amplitude of universal tilting movement of said plate; plate oscillating means oscillating said plate from side to side angularly about the axis of said plate simultaneously with the tilting movement thereof; adjusting means connected with said plate oscillating means whereby the amplitude of oscillation of said plate may be varied; and control means connected with said plate oscillating means for rendering said plate oscillating means inoperative.

4. In a mechanical movement of the class described, a driven shaft; bearing means adjustably connected with an end portion of said driven shaft and having an axis normally inclined relative to the axis of said driven shaft and intersecting the axis of said driven shaft; a plate supported by said bearing means for universal tilting movement by rotation of said driven shaft; means for adjusting the inclination of the axis of said bearing means relative to the axis of said driven shaft to vary the amplitude of universal tilting movement of said plate; plate oscillating means oscillating said plate from side to side angularly about the axis of said plate simultaneously with tilting movement thereof; angle adjusting means connected with said plate oscillating means to provide for angularly varying the zone of oscillation covered by said plate; and amplitude adjusting means connected with said plate oscillating means whereby the amplitude of oscillation of said plate may be varied.

5. In a mechanical movement of the class described, a driven shaft; bearing means adjustably connected with an end portion of said driven shaft and having an axis normally inclined relative to the axis of said driven shaft and intersecting the axis of said driven shaft; a plate supported by said bearing means for universal tilting movement by rotation of said driven shaft; means for adjusting the inclination of the axis of said bearing means relative to the axis of said driven shaft to vary the amplitude of universal tilting movement of said plate; plate oscillating means adapted to oscillate said plate from side to side angularly about the axis on which said plate is mounted simultaneously with the universal tilting movement thereof; adjusting means connected with said plate oscillating means whereby the amplitude of oscillation of said plate may be varied; and control means connected with said plate oscillating means for rendering said plate oscillating means inoperative without interfering with the universal tilting movement of said plate.

6. In a mechanical movement of the class described, a driven shaft; a bearing cup pivotally mounted on one end portion of said shaft for angular adjustment on an axis transverse to the axis of the shaft; bearing cup adjusting means adapted to adjust said bearing cup and support the same in adjusted positions; and swash plate means having a stub shaft rotatably supported in said bearing cup.

7. In a mechanical movement of the class described, a driven shaft; a bearing cup pivotally mounted on one end portion of said shaft for angular adjustment on an axis transverse to the axis of the shaft; a gear segment on said bearing cup having a center which coincides with the axis upon which said bearing cup is pivotally mounted; a screw connected with said shaft and operatively engaging said gear segment of said bearing cup for angularly adjusting the bearing cup and supporting the same in adjusted positions; and swash plate means having a bearing portion supported by said bearing cup for rotation coaxially of said bearing cup.

8. In a mechanical movement of the class described, a driven shaft; a bearing cup pivotally mounted on one end portion of said shaft for angular adjustment on an axis transverse to the axis of the shaft; bearing cup adjusting means adapted to adjust said bearing cup and support the same in adjusted positions; swash plate supporting means having a bearing portion supported by said bearing cup for rotation coaxially of said bearing cup; and swash plate means adjustably supported on said swash plate for adjustment transversely of the axis of the bearing of said swash plate supporting means.

9. In a mechanical movement of the class described, a driven shaft; a bearing cup pivotally mounted on one end portion of said shaft for angular adjustment on an axis transverse to the axis of the shaft; bearing cup adjusting means adapted to adjust said bearing cup and support the same in adjusted positions; swash plate supporting means having a bearing portion supported by said bearing cup for rotation coaxially of said bearing cup; a plate member adjustably supported on said swash plate supporting means for adjustment transversely of the axis of the bearing of said swash plate supporting means; and another plate member supported on said first named plate member for adjustment in a direction substantially at right angles to the direction of adjustment of said first named plate member.

10. In a mechanical movement of the class described; a driven shaft; forked bracket means secured to an end portion of said shaft; a bearing cup pivoted for angular movement in said forked bracket on an axis at right angles to the axis of the shaft; a gear segment on said bearing cup concentric to the pivotal axis of the cup; a screw journaled in said forked bracket and meshing with said gear segment and adapted to angularly position and hold said bearing cup; and swash plate means having a bearing portion supported by said bearing cup for rotation coaxially of said bearing cup.

11. In a mechanical movement of the class described; a driven shaft; forked bracket means secured to an end portion of said shaft; a bearing cup pivoted for angular movement in said forked bracket on an axis at right angles to the axis of the shaft; a gear segment on said bearing cup concentric to the pivotal axis of the cup; a screw journaled in said forked bracket and meshing with said gear segment and adapted to angularly position and hold said bearing cup; swash plate supporting means having a bearing portion supported by said bearing cup for rotation coaxially of said bearing cup; swash plate means connected with said swash plate supporting means; a shank extending sidewise from said swash plate supporting means; and oscillating devices connected with said shank adapted to oscillate said swash plate supporting means angularly about the axis of the bearing cup.

12. In a mechanical movement of the class described, a driven shaft; bearing means adjustably connected with an end portion of said driven shaft and having an axis normally inclined relative to the axis of said driven shaft and intersecting the axis of said driven shaft; a plate supported by said bearing means for universal tilting movement by rotation of said driven shaft; means for adjusting the inclination of the axis of said bearing means relative to the axis of said driven shaft to vary the amplitude of universal tilting movement of said plate; plate oscillating means connected with said swash plate adapted to oscillate said swash plate from side to side angularly about the axis of said swash plate; an eccentric disc on said shaft; devices operated by said eccentric disc for moving said swash plate oscillating means; and adjusting means connected with said operating devices whereby the amplitude of oscillation of said swash plate will be varied.

13. In a mechanical movement of the class described, a driven shaft; bearing means adjustably connected with an end portion of said driven shaft and having an axis normally inclined relative to the axis of said driven shaft and intersecting the axis of said driven shaft; a plate supported by said bearing means for universal tilting movement by rotation of said driven shaft; means for adjusting the inclination of the axis of said bearing means relative to the axis of said driven shaft to vary the amplitude of universal tilting movement of said plate; plate oscillating means connected with said swash plate adapted to oscillate said swash plate from side to side angularly about the axis of said swash plate; an eccentric disc on said shaft; bar means pivoted for angular movement and operated by said eccentric disc for moving said swash plate oscillating means; and devices for adjusting the pivot of said bar means toward and away from said eccentric disc whereby the amplitude of oscillation of said swash plate will be varied.

14. In a mechanical movement of the class described; a driven shaft; swash plate means connected with an end portion of said shaft for universal tilting movement; swash plate oscillating means connected with said swash plate adapted to oscillate said swash plate from side to side angularly about the axis of said swash plate; an eccentric disc on said shaft; swinging bar means operated by said eccentric disc for moving said swash plate oscillating means; and adjustable means for angularly positioning said swinging bar means whereby said swash plate may be oscillated in different zones.

15. In mechanical movement means of the class described; a driven shaft; swash plate means connected with an end portion of said shaft for universal tilting movement; a swinging bracket pivoted on said shaft; telescopic swash plate oscillating means supported by said bracket substantially parallel to said shaft and connected with said swash plate means for oscillating said swash plate means angularly about the axis thereof; an eccentric disc on said shaft; pivotally supported bar means connected with said telescopic swash plate oscillating means and said eccentric disc whereby said bar means and said plate oscillating means will be oscillated by said eccentric disc; an angularly movable lever arm fulcrumed on said shaft; a pivot block movable longitudinally of said lever arm; a pivot on said pivot block supporting said bar means for angular movement; adjusting means for moving said pivot block toward and away from said eccentric disc; and means for holding said lever arm in adjusted angular positions.

16. In a mechanical movement of the class described; a driven shaft; swash plate means connected with an end portion of said shaft for universal tilting movement; swash plate oscillating means connected with said swash plate adapted to oscillate said swash plate from side to side angularly about the axis of said swash plate; an eccentric disc mounted on said shaft; clutch means for selectively connecting or disconnecting said disc with said shaft as respects rotation of said shaft; and devices operated by said eccentric disc for moving said swash plate oscillating means.

17. Devices of the class described comprising a footplate shaped to receive a human foot; a substantially upright driven shaft; means supporting said footplate for swash plate movement on the upper end portion of said shaft; and adjustable positioner means within said footplate at the location of the metatarsal arch and heel portions thereof respectively.

18. In a mechanical movement of the class described, a tubular driven shaft; swash plate means positioned adjacent one end of said shaft; bearing means adjustably connected with an end portion of said driven shaft and having an axis normally inclined relative to the axis of said driven shaft, said bearing means connecting said swash plate means with said shaft; an adjusting rod positioned within said tubular shaft and connected with said bearing means adapted to adjust the axial position of said bearing means relative to said shaft; and adjusting rod operating means connected with said adjusting rod for moving said rod when said shaft is rotating.

19. In apparatus of the class described an upright driven shaft; crank forming means on the upper end portion of said shaft positioned at an angle to the axis of the shaft; dual footplate means composed of a forward portion and a heel portion independent of each other said forward portion being mounted on said inclined crank forming means whereby a swash plate movement will be imparted to said forward portion by rotation of said shaft; and means supporting said heel portion of said foot plate for side to side swinging movement with the forward end of said heel portion in approximate registration with the rear end of said forward portion and spaced therefrom.

ALWIN KOST.